(12) United States Patent
Vink et al.

(10) Patent No.: US 11,480,779 B2
(45) Date of Patent: Oct. 25, 2022

(54) SLIDE HOLDING IN DIGITAL PATHOLOGY

(71) Applicant: KONINKLIJKE PHILIPS N.V., Eindhoven (NL)

(72) Inventors: Jelte Peter Vink, Waalre (NL); Johannes Hubertus Antonius Van De Rijdt, Eindhoven (NL); Nicole Catharina Elisabeth Haazen, Eindhoven (NL); Gerard Rudolf Riemens, Eindhoven (NL); Emilianus Henricus Anthonius Johannes Nuijten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 652 days.

(21) Appl. No.: 16/463,636

(22) PCT Filed: Nov. 28, 2017

(86) PCT No.: PCT/EP2017/080697
§ 371 (c)(1),
(2) Date: May 23, 2019

(87) PCT Pub. No.: WO2018/099918
PCT Pub. Date: Jun. 7, 2018

(65) Prior Publication Data
US 2019/0317310 A1    Oct. 17, 2019

(30) Foreign Application Priority Data
Nov. 29, 2016    (EP) .................................... 16201154

(51) Int. Cl.
*G02B 21/34*   (2006.01)
*G01N 35/00*   (2006.01)
*G02B 21/36*   (2006.01)

(52) U.S. Cl.
CPC ....... *G02B 21/34* (2013.01); *G01N 35/00029* (2013.01); *G02B 21/365* (2013.01); *G01N 2035/00039* (2013.01)

(58) Field of Classification Search
CPC .................. G02B 21/34; G02B 21/365; G01N 35/00029; G01N 2035/00039; G01N 1/31
(Continued)

(56) References Cited

U.S. PATENT DOCUMENTS 4,501,495 A * 2/1985 Faulkner ................ G02B 21/34
                                                   356/244
5,364,790 A * 11/1994 Atwood .................. G01N 1/312
                                                   359/398
(Continued)

FOREIGN PATENT DOCUMENTS

| EP | 0798550 A1 | 10/1997 |
|---|---|---|
| WO | WO2008084926 A1 | 7/2008 |
| WO | WO2012178157 A1 | 12/2012 |

OTHER PUBLICATIONS

PCT International Search Report, International application No. PCT/EP2017/080697, dated Feb. 2, 2018.
(Continued)

*Primary Examiner* — Stephone B Allen
*Assistant Examiner* — Rahman Abdur
(74) *Attorney, Agent, or Firm* — Sherry Austin

(57) ABSTRACT

The present invention relates to digital pathology. In order to provide an improved handling of probes in digital pathology, a slide-holder (10) for digital pathology is provided that comprises a tray basis (12), a plurality of mounting means (14) and a plurality of slide-holder registration points (16). The tray basis is configured to carry a plurality of slides (20) to be imaged by a digital pathology system, for which the tray basis provides a plurality of slide-receiving positions. The plurality of mounting means are arranged on the tray
(Continued)

basis to mount the plurality of slides on the tray basis in a plurality of slide-receiving positions to image each slide in a separate imaging position. The slide-holder registration points comprise a plurality of interacting portions (22) that provide a mechanical registration of the tray basis with a digital pathology system for each of the imaging positions.

15 Claims, 5 Drawing Sheets

(58) Field of Classification Search
    USPC .......................................................... 359/398
    See application file for complete search history.

(56) References Cited

U.S. PATENT DOCUMENTS

| | | | |
|---|---|---|---|
| 5,428,690 A | 6/1995 | Bacus | |
| 5,641,683 A | 6/1997 | Van Dusen | |
| 6,479,807 B1* | 11/2002 | Toshimitsu | G02B 21/06 |
| | | | 250/201.3 |
| 9,063,341 B2 | 6/2015 | Heise | |
| 2003/0231791 A1* | 12/2003 | Torre-Bueno | G06T 7/0012 |
| | | | 382/133 |
| 2008/0101666 A1 | 5/2008 | Hunt | |
| 2011/0249327 A1 | 10/2011 | Yamamoto | |
| 2012/0003627 A1 | 1/2012 | Scholl | |
| 2012/0044342 A1* | 2/2012 | Hing | G02B 21/365 |
| | | | 348/79 |
| 2012/0075695 A1 | 3/2012 | DeBlasis | |
| 2012/0108461 A1 | 5/2012 | Bussan | |
| 2013/0105320 A1 | 5/2013 | Samson | |
| 2013/0132006 A1* | 5/2013 | Gwynn | B01L 3/021 |
| | | | 702/55 |
| 2013/0201553 A1* | 8/2013 | James | G02B 21/34 |
| | | | 359/398 |
| 2014/0270333 A1 | 9/2014 | Cansancio | |
| 2016/0147056 A1 | 5/2016 | Corwin | |

OTHER PUBLICATIONS

Observations on the PCT International Search Report and the Written Opinion of International Application No. PCT/EP2017/080697, dated Feb. 21, 2019.

\* cited by examiner

SLIDE HOLDING IN DIGITAL PATHOLOGY

CROSS-REFERENCE TO RELATED APPLICATIONS

This patent application claims the priority benefit under 35 U.S.C. § 371 of international patent application no. PCT/EP2017/080697, filed Nov. 28, 2017, which claims the benefit of European Patent Application No. 16201154.8, filed on Nov. 29, 2016, the contents of which are hereby incorporated by reference herein.

FIELD OF THE INVENTION

The present invention relates to a slide-holder for digital pathology, to a slide-holder fixation and a digital pathology system as well as to a method for digital pathology.

BACKGROUND OF THE INVENTION

For examination purposes, e.g. in molecular pathology, tissue probes are provided, for example, on glass substrates like slides. The probes are studied and can be marked to extract certain areas for further examination purposes. For increased efficiency, a plurality of slides can be provided on one tray. For example, EP 0 798 550 A1 describes a slide viewing apparatus. However, it has been shown that the procedure is still cumbersome and economic considerations have become even more important.

SUMMARY OF THE INVENTION

There may be a need to provide an improved handling of probes in digital pathology.

The object of the present invention is solved by the subject-matter of the independent claims; further embodiments are incorporated in the dependent claims. It should be noted that the following described aspects of the invention apply also for the slide-holder for digital pathology, for the slide-holder fixation and for the digital pathology system as well as for the method for digital pathology.

According to the invention, a slide-holder for digital pathology is provided that comprises a tray basis, a plurality of mounting means and a plurality of slide-holder registration points. The tray basis is configured to carry a plurality of slides to be imaged by a digital pathology system, for which the tray basis provides a plurality of slide-receiving positions. The plurality of mounting means are arranged on the tray basis to mount the plurality of slides on the tray basis in a plurality of slide-receiving positions to image each slide in a separate imaging position. The slide-holder registration points comprise a plurality of interacting portions that provide a mechanical registration of the tray basis with a digital pathology system for each of the imaging positions.

According to an example, the slide-holder registration points are provided as bi-functional registration points, wherein the interacting portions, in addition to the mechanical registration, are provided as markers used for an optical registration of an image of the respective slide of the plurality of slides with the tray basis.

According to an example, the interacting portions are provided as mechanical abutting surfaces configured to engage with mechanical registration means of a slide-holder fixation arrangement of a digital pathology system for positioning a respective slide of the plurality of slides mounted on the slide-holder in relation to the digital pathology system. The interacting portions are visible in an image of the slide.

Preferably, the interacting portions are provided as recesses of the tray basis.

Further preferably, the recesses are provided as V-shaped recesses that provide a centered abutting of a protrusion element for the mechanical registration and that provide a detection in image processing for the optical registration.

According to the invention, also a slide-holder fixation arrangement for digital pathology is provided. The slide-holder fixation arrangement comprises a receiving space to receive a slide-holder for digital pathology carrying a plurality of slides and to position the slide-holder in a plurality of positions. The slide-holder further comprises registration means to interact with slide-holder registration points of a slide-holder. The registration means provide a mechanical interaction. The mechanical interaction of the registration means and the slide-holder registration points provides a positioning of a slide-holder in the plurality of positions.

In embodiments of the invention, the slide-holder fixation arrangement may be fixedly mounted on the top surface of a table. This may be particularly interesting in cases where the invention is used to provide an operator the ability to manually cut a region of interest from a sample slide mounted on the slide-holder registered with the slide-handling fixation arrangement. These aspects will be further explained herein-after.

Preferably, the registration means are provided as protrusions to engage with recesses of a tray basis of a slide-holder.

Further preferably, the protrusions are provided at least partly as resiliently supported balls. Therefore, the recess and protrusion configuration may be able to provide a stable position of the tray holder. For example, the stability may be such that an operator can manipulate the sample on the slide in position for a sample extraction process. For example, he/she may be able to cut a region of interest out of the sample without moving the tray holder, and this even by putting a hand carrying a knife on a surface of the tray holder that is lying between the opening receiving this slide and an adjacent opening, for ensuring a good stabilization of the hand and accuracy of the cutting movement.

According to the invention, also a digital pathology system is provided that comprises a slide handling arrangement, a slide-holder fixation arrangement according to the example above and at least one slide-holder according to one of the examples above. The slide handling arrangement comprises means to process slides mounted on the slide-holder. The registration means of the slide-holder fixation arrangement interact with the slide-holder registration points of the at least one slide-holder. The interaction of the registration means and the slide-holder registration points provides a positioning of the slide-holder in a plurality of positions.

According to an example, the slide handling arrangement comprises an image detection arrangement that provides imaging for an acquisitioning as a first phase.

Preferably, for the imaging, the optical registration is used.

According to an example, the slide handling arrangement comprises a sample processing station that is provided for a further analysis as a second phase.

Preferably, for the sample processing, the mechanical registration is used.

Further preferably, the sample processing station comprises a dissection arrangement.

In an example, the dissection arrangement is provided manually. For example, the slide-holder with mounted slides is provided in a movable manner to allow a user to adjust for facilitated dissection, e.g. cutting or scraping.

In another example, the dissection arrangement is provided as an automated dissection sub-station. For example, the slide-holder with mounted slides is provided on a support that is movable in relation to a scraping or cutting arrangement. As an example, the scraping or cutting arrangement comprises means to actually take off tissue and to place it in a receptacle.

According to an example, annotation means are provided that are configured to identify a location of a point or region of interest on a slide of a slide-holder in a spatial relation to the slide-holder in a first slide handling device. A transfer unit is provided that is configured to transfer the location of the identified point or region of interest on the slide-holder in a spatial relation to the slide-holder in a second slide handling device.

According to the invention, also a method for digital pathology is provided that comprises the following steps: a1) receiving a slide-holder with a plurality of slides mounted thereon in a receiving space of a slide-holder fixation arrangement in a first position; wherein in the first position, registration means of the slide-holder fixation arrangement are mechanically interacting with slide-holder registration points of the slide-holder; a2) processing a first slide of the plurality of slides; b1) moving the slide-holder to a second position, wherein in the second position, registration means of the slide-holder fixation arrangement are mechanically interacting with second slide-holder registration points of the slide-holder; and b2) processing a second slide of the plurality of slides. Based on the interaction, a mechanical registration of each slide in relation to an imaging system is provided.

According to an example, it is provided to identify a location of a point or region of interest on at least one stained slide of the slides of the slide-holder in a spatial relation to the slide-holder based on optical registration, and to transfer the location from the at least one stained slide to at least one unstained slide of the slides of the slide-holder based on mechanical registration of the slide-holder.

According to an example, it is provided to identify a location of a point or region of interest on at least one image of a stained slide in a spatial relation to a slide-holder based on optical registration, and to transfer the location from the at least one image of the stained slide to at least one unstained slide of slides of a slide-holder based on mechanical registration of the slide-holder.

For example, a stained image, such as an H&E image, has been processed before, e.g. the image has been captured in a first stage of a diagnostic procedure and has been stored in a laboratory information system or another storage, e.g. an image management system, and the current action takes place in a second stage when a pathologist has concluded that a molecular diagnostic test is needed. The H&E image is obtained from the storage.

In another example, the H&E image is obtained from the sample on the slide-holder.

In another example, stained slides are provided that are not fixed in a slide-holder, but that are imaged by a digital microscope scanner. Following, a region of interest is identified on the stained slide. This region of interest is then detected in an image of the unstained slide, which is fixed in the slide-holder. This provides the location of the region of interest in relation to the slide-holder. The region of interest is then transferred to slides on the slide-holder using mechanical registration of the slide-holder.

According to an aspect, a slide-holder is provided that is equipped with bi-functional registration means. The registration is done on a mechanical basis with an interaction with counter parts of the slide-holder fixation. The registration is further done on an optical basis by identifying the mechanical registration means in an image and to use these as reference points; for example for transferring a detected region of interest to other slides of the same sample, such as from stained to unstained samples.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
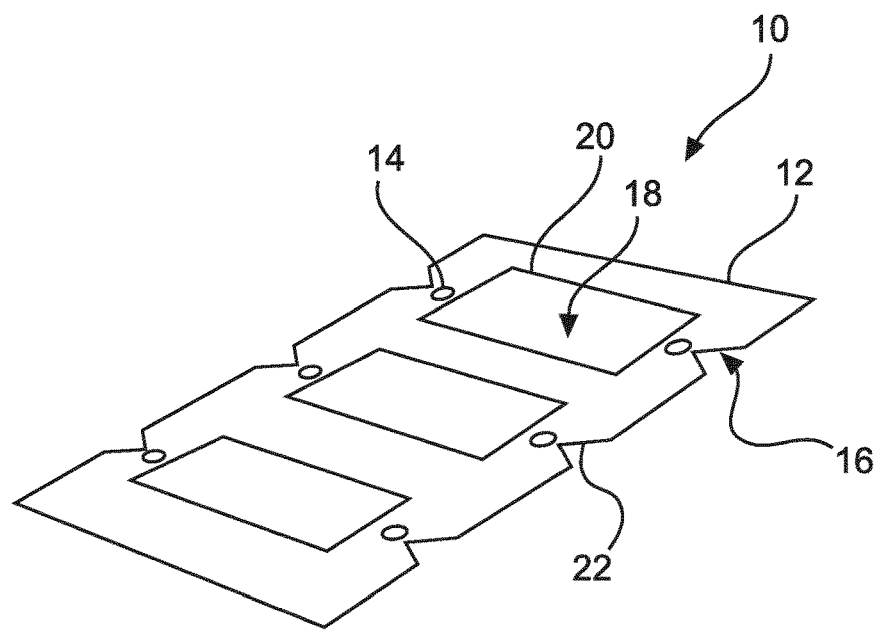
FIG. 1 shows a perspective view of an example of a slide-holder.

FIG. 1 shows a slide-holder 10 for digital pathology. The slide-holder 10 comprises a tray basis 12, a plurality of mounting means 14 and a plurality of slide-holder registration points 16. The tray basis 12 is configured to carry a plurality of slides 18 to be imaged by a digital pathology system. The tray basis provides a plurality of slide-receiving positions 20 for this purpose. In an example, the slides 18 are smaller than the openings in form of the slide-receiving positions 20. The plurality of mounting means 14 are arranged on the tray basis 12 to mount the plurality of slides on the tray basis in a plurality of slide-receiving positions as shown to image each slide in a separate imaging position. The slide-holder registration points 16 comprise a plurality of interacting portions 22 that provide a mechanical registration of the tray basis 12 with a digital pathology system for each of the imaging positions.

In an option, an image is acquired that comprises multiple slides, e.g. for performance test procedures or performance reasons.

The mechanical registration can be provided for imaging purposes or for other slide-handling or slide-treating purposes, such as scraping or extracting steps.

The "mounting means" relate to fixing the slides on the tray basis 12 for imaging purposes. This may be provided to be a temporarily fixing or mounting or also a permanent attachment.

In an example, the slides are mounted on the tray by clamping, i.e. a plurality of clamps are provided. In another example, the slides are mounted on the tray by using a tape.

The term "points" relates to a function provided at a certain position, but the term does not mean that the registration is restricted to a geometric point. Rather, the registration can be provided by a surface configuration that comprises a geometric extension, such as a V-shaped recess or a groove.

In an example, one of the means is used for mounting one slide. In another example, a plurality of the means is used for mounting one slide, for example, two means for mounting one slide. In another example, one of the means is used for mounting several slides.

The interacting portion 22 is provided as a bi-functional portion that provides the mechanical registration and the optical registration. The "interacting portion" is also referred to as mechanical interacting portion.

In an example, two interacting portions 22 are provided for each slide-receiving position, i.e. two interacting portions 22 for each imaging position, or, in other words, two interacting portions for each slide of the plurality of slides.

In another example, three or more interacting portions 22 are provided for each slide-receiving position.

The digital pathology system can be a digital pathology imaging system. In an example, the term digital pathology relates to imaging at approximately 25 µm (micro-meter) per pixel. In an example, the term digital pathology relates to microscopic imaging at approximately 0.25 µm (micrometer) per pixel. In an example, the digital pathology system is a digital pathology microscope. Of course, the given values are examples, and in further options, different resolutions are also provided.

In another example, the slide-holder is provided for a digital microscopy, e.g. with high magnification.

For example, the slide-holder registration points 16 are provided as reference points for image detection.

For example, the multiple slide-receiving positions are matching with the slide-holder registration points.

In an example, the slide-holder registration points 16 are provided as bi-functional registration points, wherein the interacting portions 22, in addition to the mechanical registration, are provided as markers used for an optical registration of an image of the respective slide of the plurality of slides with the tray basis 12.

In an example, the interacting portions 22 are provided as mechanical abutting surfaces configured to engage with mechanical registration means of a slide-holder fixation arrangement of a digital pathology system for positioning a respective slide of the plurality of slides mounted on the slide-holder in relation to the digital pathology system. This mechanical configuration may provide a stable position of the tray holder. The force exerted on the tray holder to maintain it in position may be chosen depending on the type of application. For instance, when the application just relates to imaging the slide in position, the stabilizing force may be designed to be less important than when the application relates to processing the sample on the slide (e.g. extraction of a region of interest from the sample). The interacting portions are visible in an image of the slide. Preferably, the interacting portions 22 are provided as recesses of the tray basis. Further preferably, the recesses are provided as V-shaped recesses that provide a centered abutting of a protrusion element for the mechanical registration and that provide a detection in image processing for the optical registration.

As a further option, for the interacting portions 22 it is provided to arrange recesses with half-circular or block-shaped contours in viewing direction.

The recesses may be provided with guiding surfaces that guide an interacting protrusion or extending portion as a counterpart towards the desired "center", i.e. location in which the interacting portion abuts in a stable manner. A round portion may be arranged to be aligned in a recess with sidewalls as guiding surfaces. An intensity of the stabilizing force may be designed by adapting any design parameter that relates to the interacting portion and/or the protrusions (form, shape, use of a spring to control the engagement movement, etc.). The guiding surfaces may also act as markers in an image.

In an option, the interacting portions 22 are provided as protrusions. The side surfaces act as guiding surfaces. The counterpart is then provided as recesses, i.e. vice versa than described above.

In an example, the recesses, e.g. the V-shaped recesses, are provided along the outer (circumferential edge) of the tray basis.

The V-shaped recesses are also referred to as V-grooves that are provided on the outer periphery of the tray basis.

In an alternative example, the interacting portions are provided as projecting portions to engage with recesses of a slide-holder fixation arrangement of a digital pathology system, i.e. a digital pathology imaging system e.g. a digital pathology scanner or a digital pathology microscope.

Figure 2A:
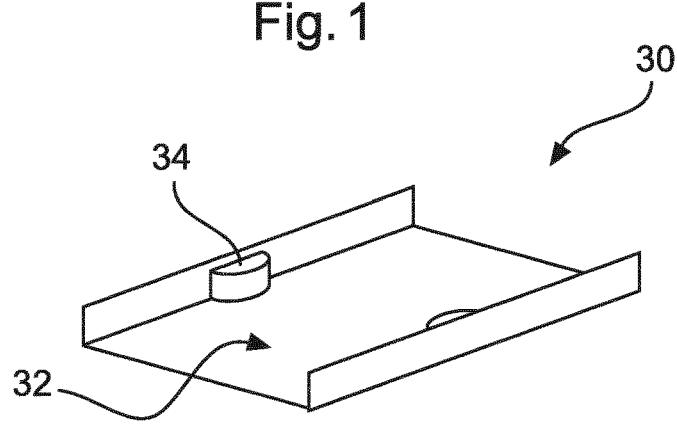
FIG. 2a shows a perspective view of an example of a slide-holder fixation arrangement.
Figure 2B:
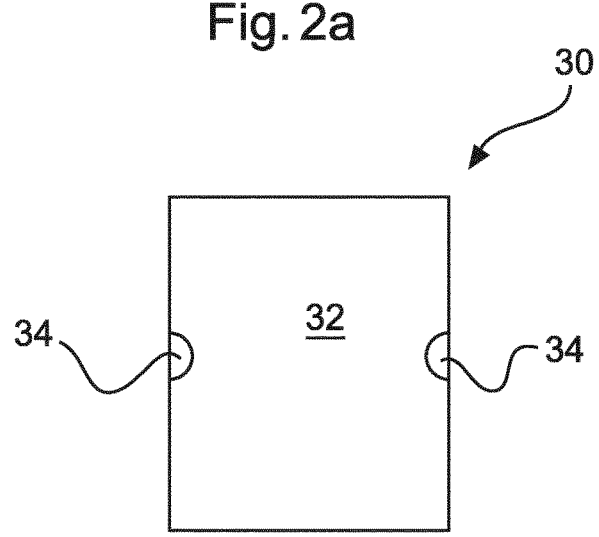
FIG. 2b shows the slide-holder fixation arrangement of FIG. 2a in a top view.

FIG. 2a shows a slide-holder fixation arrangement 30 for digital pathology in a perspective view. FIG. 2b shows the slide-holder fixation arrangement 30 in a top view. The slide-holder fixation arrangement 30 comprises a receiving space 32 to receive a slide-holder for digital pathology carrying a plurality of slides and to position the slide-holder in a plurality of positions. The slide-holder fixation arrangement 30 further comprises registration means 34 to interact with slide-holder registration points of a slide-holder. The registration means 34 provide a mechanical interaction. The mechanical interaction of the registration means 34 and the slide-holder registration points provides a positioning of a slide-holder in the plurality of positions. Preferably, the registration means are provided as protrusions to engage with recesses of a tray basis of a slide-holder. Further preferably, the protrusions are provided at least partly as resiliently supported balls.

In an example, the receiving space 32, as shown in FIG. 2a, is used for slide processing steps, for example for scraping purposes, and not for imaging.

For example, the slides are used for imaging, i.e. they are to be imaged. As an example, the slides are used for imaging in another device. For imaging a different slide-holder fixation arrangement might be provided. In a further example, the receiving space 32 of FIG. 2a is alternatively or additionally used for imaging purposes. As an option, the slide-holder fixation arrangement is used in a different device for imaging. As a further option, the slide-holder fixation arrangement is used in the same device for imaging as for the scraping.

In an example, the registration means 34 are provided as recesses, as indicated above, e.g. as V-shaped elements.

The protrusions as registration means may comprise balls or other elements with a round shaped front surface that are supported in a resilient manner. The balls may be held in a rotatable manner. The protrusions may also be provided as pins that are fixed by a resiliently supported basis such that the pins engage with their side surface with the recesses.

In an example, the registration means comprise an abutting surface for abutting of a tray basis of a slide-holder on one side, and at least one resiliently supported ball on the other side to abut and engage with a recess of the tray basis.

In another example, the registration means comprise balls to engage with recesses of a tray basis of a slide-holder on both sides, wherein the balls are supported resiliently at least on one side of the tray. One or several balls can be provided on each side to engage with matching recesses of the slide-holder tray basis.

Figure 3A:
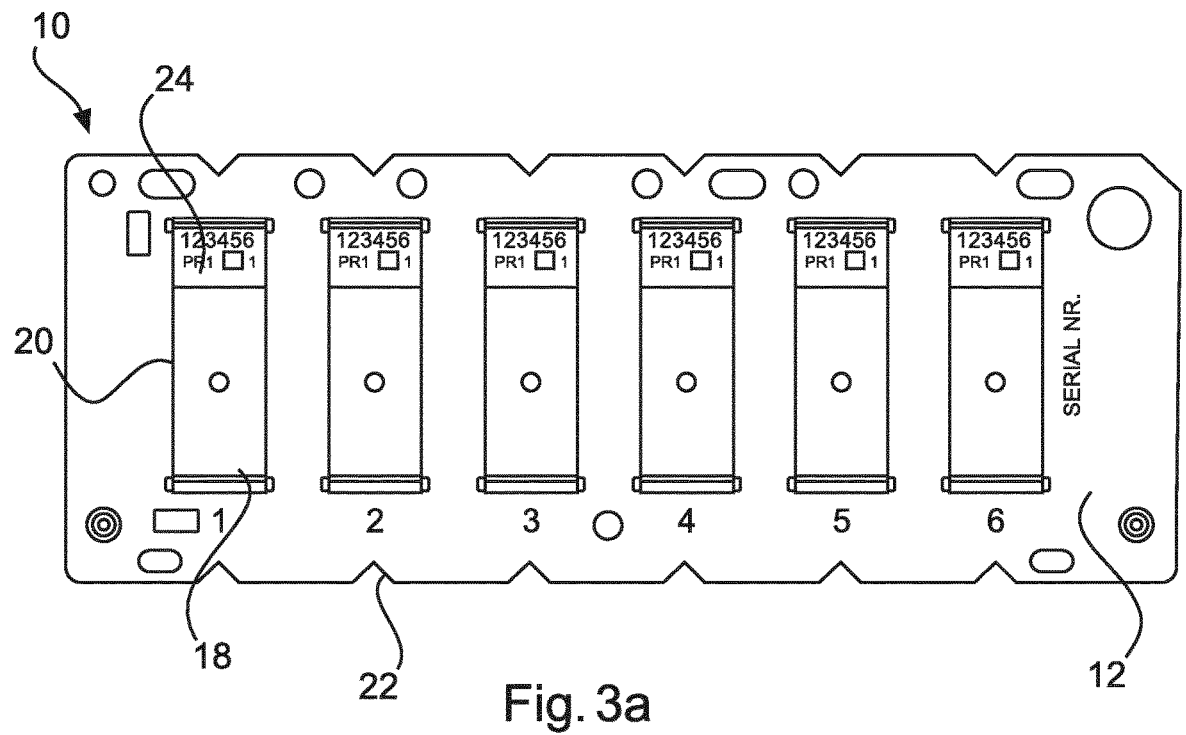
FIG. 3a shows a top view of another example of a slide-holder.
Figure 3B:
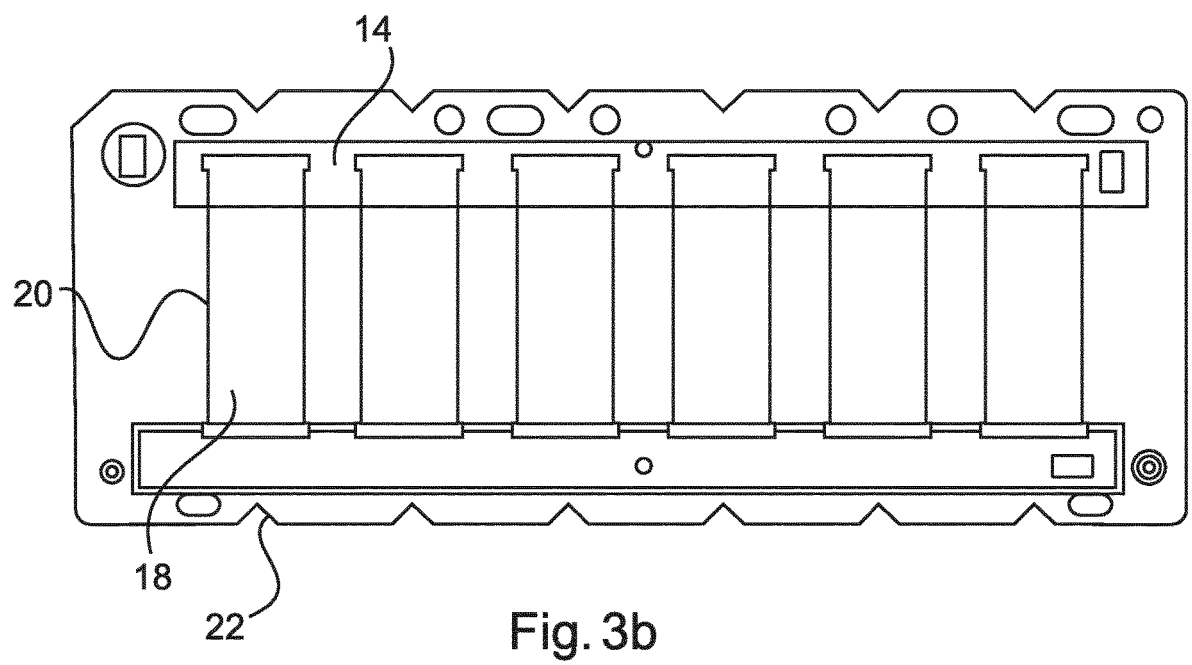
FIG. 3b shows the slide-holder of FIG. 3a in a bottom view.

FIG. 3a shows an example of the slide-holder 10 in a top view and FIG. 3b shows the example of the slide-holder 10 in a bottom view. A plurality of six slides 20 is mounted by the mounted means 14. The tray basis 12 has a respective number of openings such that the slides can be imaged. The openings are spaced apart from each other with a surface, for example a plane homogeneous surface, lying in between. The surface in between the slides notably provides an interesting advantage when the application relates to sample processing. In particular, the surface may be designed to allow placing a (part of) hand for ensuring its stability when manually cutting a region of interest (for example with a scalpel). The slides may comprise information label portions 24. For each of the slides, the interacting portions 22 are provided in form of V-shaped recesses.

Figure 4:
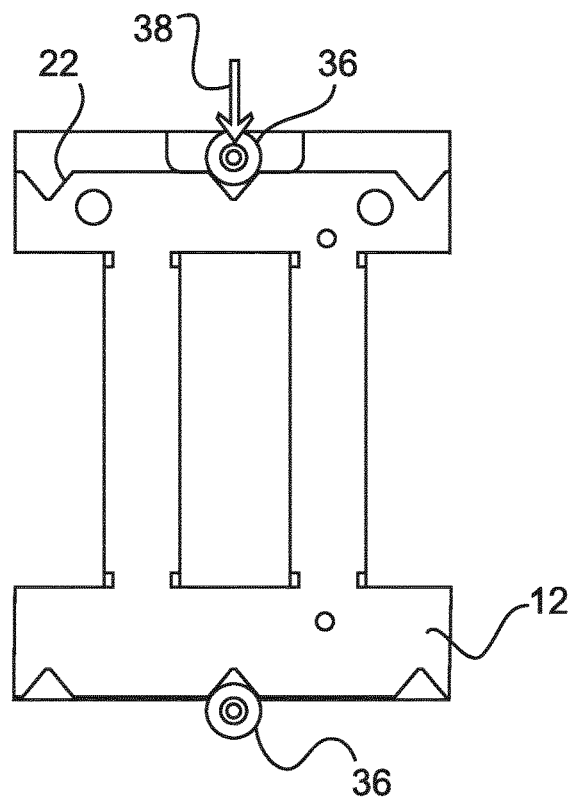
FIG. 4 shows a detail of an example of a slide-holder in a slide-holder fixation in a top view.

FIG. 4 shows the interaction of the V-shaped recesses with matching balls 36 as examples for the registration means of the slide-holder fixation arrangement. An arrow 38 indicates that at least one of the matching balls 36 is supported in a resilient manner in order to properly engage with the V-shaped recess.

Figure 5:
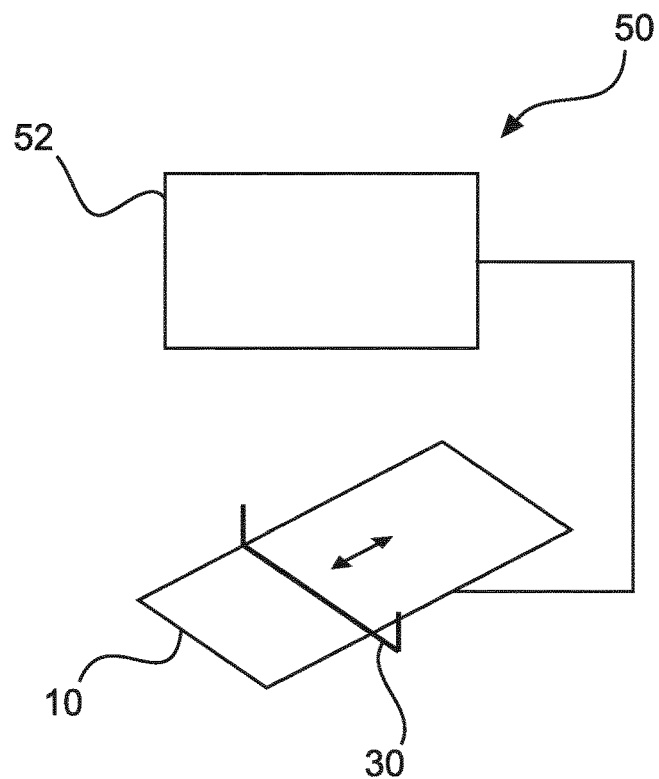
FIG. 5 shows a schematic setup of an example of a digital pathology system.

FIG. 5 shows a digital pathology system 50 comprising a slide handling arrangement 52 and a slide-holder fixation arrangement 30 according to the examples above. Further, at least one example of the slide-holder 10 according to one of the examples above is shown. The slide handling arrangement 52 comprises means to process slides mounted on the slide-holder, e.g. imaging means to generate images of slides mounted on the slide-holder. The registration means of the slide-holder fixation arrangement interact with the slide-holder registration points of the at least one slide-holder. The interaction of the registration means and the slide-holder registration points provides a positioning of the slide-holder in a plurality of positions.

The term "image detection arrangement" relates to an optical device for generating images of the specimen or probes arranged on the slides. For example, the image detection arrangement is a camera. The image detection arrangement can also be referred to as image acquisition arrangement. As an option, an illumination unit is provided.

The term "slide-holder fixation arrangement" relates to a receiving device of the digital pathology system, e.g. a microscope system, or a scraping device, to insert the slide-holder for imaging purpose. The slide-holder fixation arrangement can also be referred to as slide-holder fixture, slide-holder carrier, slide-holder retainer, slide-holder fastener, or slide-holder support.

The term "slides" relates to probes or samples, such as tissue probes or other biological sample or specimen, which probes or samples are arranged on a substrate such as glass or other suitable carrier/support material for imaging purposes. The imaging may be provided by different image generation procedures. The slide may for example comprise two glass layers between which the sample or probe is arranged. In another example, the slide comprises one glass layer, i.e. a slide without a cover slip, for example used for unstained slices, i.e. the sample or probe is arranged on that single glass layer.

The tissue sample may be pre-treated for imaging purposes, such as stained or treated with particular substances in order to better visualize the different tissue or sample areas.

The slides may comprise one or more probes or samples. The term slide refers to a physical entity that is suitable for storing purposes, such as storing in a rack or other carrier provided for storing a plurality of slides. The slides are also provided to be handled in a scanning apparatus.

The term "scanning" refers to image generation of the probe or sample carried by the slide. The scanning may be arranged by providing a relative motion between the slide and an imaging system or imager. For example, the slide may be moved along a light source and camera setup for generating an image of the complete slide. In another example, a light source and camera setup is moved along the slide. In a further example, both are mutually moved in relation to each other.

In another option, "scanning" is provided with a field-of-view that is large enough to scan without moving the camera or the slide.

For registration purposes, it is only necessary to determine the slide-holder fixation arrangement's spatial relation to the image detection arrangement. After this calibration, the mechanical alignment provided by the interaction of the slide-holder registration points with the registration means allows a determination of a spatial relation of each slide on the slide-holder in relation to the image detection arrangement.

In a further option, the screen or monitor to visualize the selection of a region of interest is aligned with a fixation arrangement and the second device, e.g. the scraping device, is calibrated.

In an example, the registration is provided roughly during acquisition; the alignment is obtained via the V-shapes.

The location of a point of interest on the slide can thus be identified and transferred.

The means for processing slides may comprise imaging means.

The means for processing slides may comprise dissection means.

Figure 6:
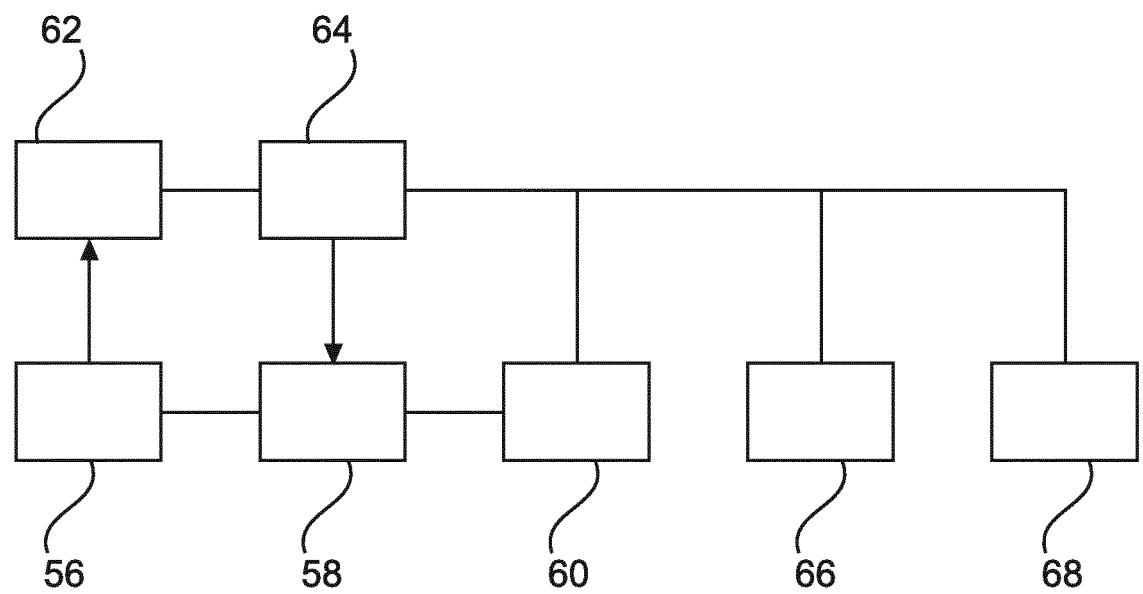
FIG. 6 shows a further example of a digital pathology system with several options.

FIG. 6 shows the digital pathology system 50 with several options that can be provided in a combined manner but also in various combinations (not shown in detail).

The slide handling arrangement 52 of the digital pathology system 50 may comprise an image detection arrangement 56 that provides imaging for an acquisitioning as a first phase. Preferably, for the imaging, the optical registration as described above is used.

The slide handling arrangement may comprise a sample processing station 58 that is provided for a further analysis as a second phase. Preferably, for the sample processing, the mechanical registration is used. Further preferably, the sample processing station comprises a dissection arrangement 60.

The slide-holder fixation arrangement only has to be aligned once with the dissection arrangement. Once this is known, the slide-holder can be position in the plurality of positions due to the mechanical interaction or mechanical registration.

As a further option, annotation means 62 may be provided that are configured to identify a location of a point or region of interest on a slide of a slide-holder in a spatial relation to the slide-holder in a first slide handling device. A transfer unit 64 is provided that is configured to transfer the location of the identified point or region of interest on the slide-holder in a spatial relation to the slide-holder in a second slide handling device.

In another option, the annotation, i.e. to identify the region of interest, is done manually.

The annotation can be provided on other slides, e.g. another stained or unstained slide, which is aligned with a slide of a slide-holder.

The slide-holder may comprise one or several slides of slices of stained or otherwise pre-treated tissue material. In another example, slide-holder may comprise one or several slides of slices of un-stained or non-treated tissue material.

The transfer unit may be configured to transfer a location of an annotation of one device to another device, for example for identifying areas to be extracted for a further determined procedure, e.g. tissue analysis.

In an example, the digital pathology system, e.g. the microscope, comprises a scan engine. The term "scan engine" relates to an imager arranged for scanning the slides. In an example, the scan engine comprises a light source and a camera. The scan engine comprises at least one image data generating unit. The scanning unit is configured to perform a main scan for each of the slides. The scanning unit may also be configured to perform a pre-scan for each of the slides to determine image related parameters.

As a still further option, a marking unit 66 is provided that comprises marking means to indicate the transferred location on the slide of the slide-holder. The marking means may comprise visual marking of the location on the slide, e.g. highlighting with a mark.

As another option, an extraction unit 68 is provided that comprises extraction means to extract a part of the tissue material at the transferred location on the slide of the second slide-holder. The extraction means may comprise a scraping tool to scrape the tissue from the sample of the slide and put the scraped material into a receptacle, e.g. a tube. In another example, the tissue is scraped via other techniques, e.g. laser micro-dissection. The extraction means may also comprise a cutting tool to cut and remove tissue areas of the sample on the slide.

As a further option, a store area unit (not shown) is provided that comprises at least one receptacle for receiving a slide-holder. Preferably, the slide-holder comprises a plurality of mounted slides.

As another option, a handling unit for transferring a slide-holder between the store area and the image detection arrangement is provided in order to scan the slides and to place back the slide-holder to the store area. The handling unit is also referred to as gripping unit, or handler or gripper. In an example, the handling unit is configured to handle one slide-holder.

Figure 7:
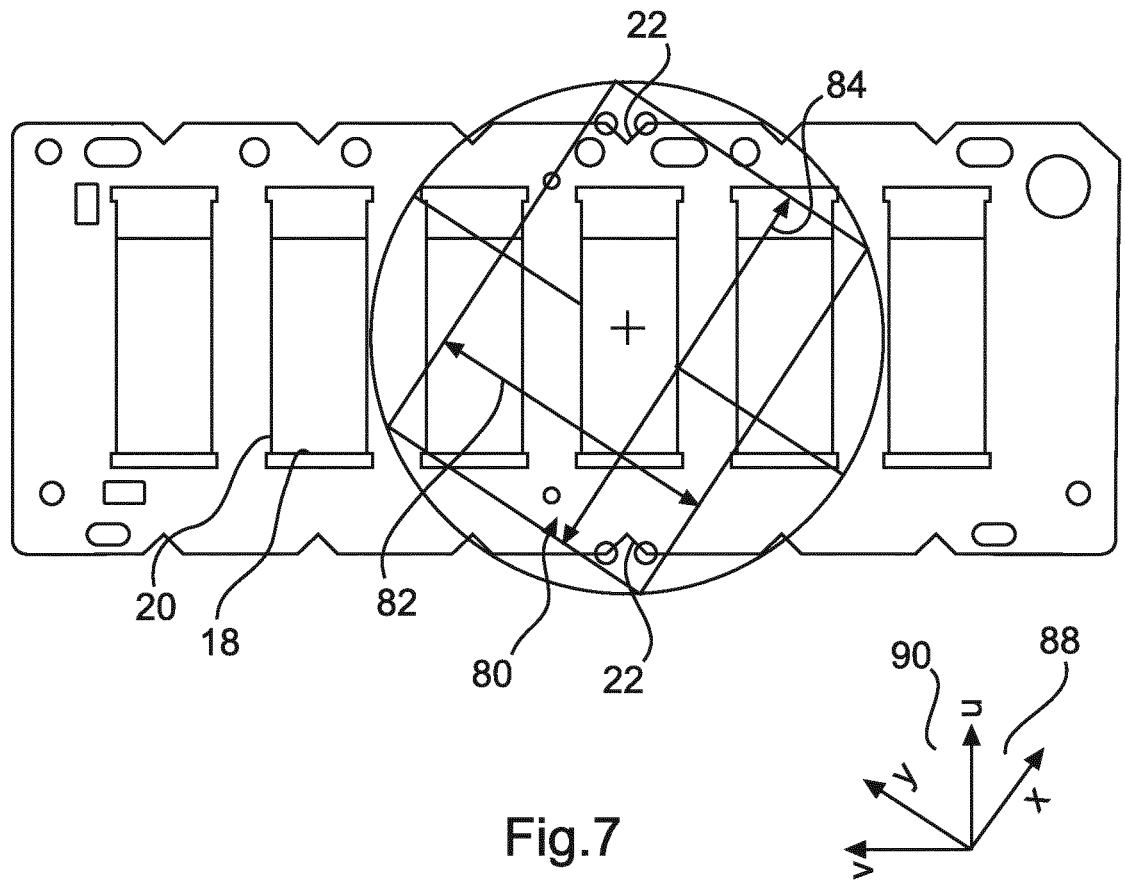
FIG. 7 shows an example of a slide-holder and an indicated field of view.

FIG. 7 shows an illustration of possible arrangements of a field of view 80 with a first width 82 and a second width 84 arranged within a circle. As indicated on the right side of the drawing of FIG. 7, the field of view can be rotated to have an X-axis inclined to an axis U with a first angle 88 and an X-axis inclined to an axis V with a second angle 90.

Figure 8:
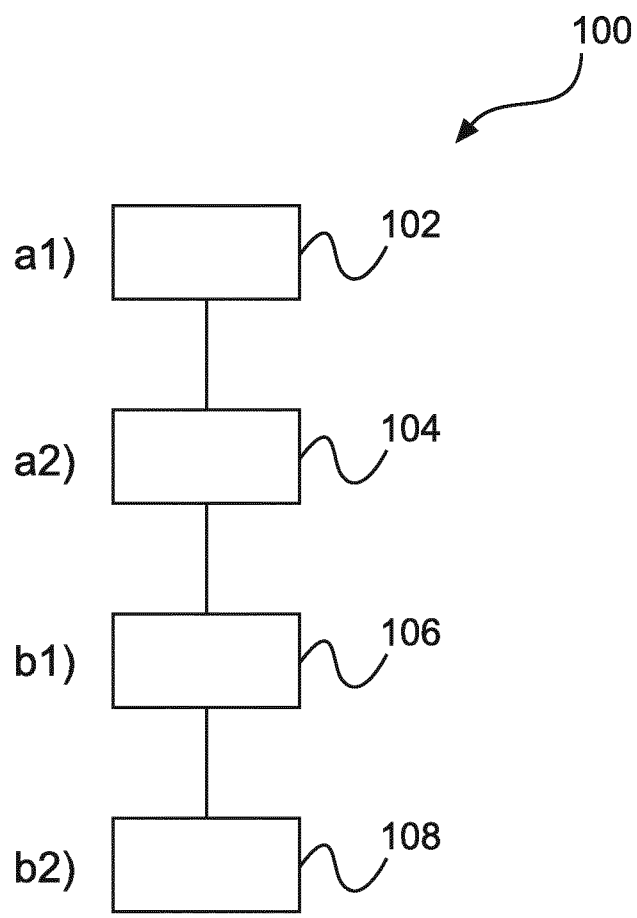
FIG. 8 shows an example of a method for digital pathology.

FIG. 8 shows steps of a method 100 for digital pathology comprising the following steps: In a first step 102, also referred to as step a), a slide-holder with a plurality of slides mounted thereon is received in a receiving space of a slide-holder fixation arrangement in a first position. In the first position, registration means of the slide-holder fixation arrangement are mechanically interacting with slide-holder registration points of the slide-holder. In a second step 104, also referred to as step a2), a first slide of the plurality of slides is processed. In a third step 106, also referred to as step b1), the slide-holder is moved to a second position. In the second position, registration means of the slide-holder fixation arrangement are mechanically interacting with second slide-holder registration points of the slide-holder. In a fourth step 108, also referred to as step b2), a second slide of the plurality of slides is processed. Based on the interaction, a mechanical registration of each slide in relation to an imaging system is provided.

In an example, the processing relates to a second device, e.g. a scraping or dissection procedure.

In an option, an acquisition phase is provided that relies on optical interaction, i.e. optical registration.

In an example, not shown in detail, the registration means of the slide-holder are visible in the respective image of the slide, and wherein an optical registration of each image in relation to an imaging system is provided. Preferably, for the optical registration borders of slide-holder registration points are detected.

In an example, the slide-holder registration points are provided as V-shaped reference points and the borders of these V-shaped recesses are detected in the image during acquisition.

In an example, the obtained image is compensated for the V-shaped recesses.

For example, the obtained images are compensated by the position of the detected markers, such as the V-shaped recesses, of an image of the respective slide of the plurality of slides with the tray basis.

In another example, also not shown in detail, it is provided:

c) identifying a location of a point or region of interest on at least one of the slides of the slide-holder in a spatial relation to the slide-holder in a first slide handling device; and d) transferring the location from the slide-holder to a slide of the slide-holder in a spatial relation to the slide-holder in a second slide handling device.

In another example, not shown in detail, it is provided:

identifying a location of a point or region of interest on at least one image of a stained slide of slides in a spatial relation to a slide-holder based on optical registration; and transferring the location from the at least one image of the stained slide to at least one unstained slide of slides of a slide-holder based on mechanical registration of the slide-holder.

In another example, also not shown in detail, it is provided:

identifying a location of a point or region of interest on at least one stained slide of the slides of the slide-holder in a spatial relation to the slide-holder based on optical registration; and transferring the location from the at least one stained slide to at least one unstained slide of the slides of the slide-holder based on mechanical registration of the slide-holder.

In a further example, also not shown in detail, it is provided:

identifying a location of a point or region of interest on at least one image of the stained slide; and transferring the location from the image of the stained slide to an image of the at least one unstained slide of the slides.

As the unstained slide is fixed in the slide-holder, the spatial relation to the slide-holder is known. The spatial relation to the slide-holder is transferred based on the mechanical registration.

In an example, a slide-holder with a first unstained sample provided on the slide-holder is clamped with the first unstained sample arranged in a projection area. The region of interest obtained from a stained slide of the same sample is projected and the region of interest is removed from the first sample. The slide-holder is de-clamped and moved or shifted such that a second sample provided on the slide-holder is arranged in the projection area. After clamping the slide-holder, the region of interest obtained from the stained slide of the same sample is projected and the region of interest is also removed from the second sample.

In other words, embodiments and examples as described above may provide an efficient way to improve workflows in pathology, in particular in histo-pathology or cyto-pathology, and more particularly in selecting biological material for molecular diagnostics. For instance, there may be situations where a pathologist may desire to quickly extract a particular region of interest out of several tissue slices for performing several molecular tests. This region of interest may typically be located at (or at least substantially) the same place on these slices, for example when these slices come from two adjacent tissue sections of a same tissue block. This task may be very tedious; a workflow can be improved. This is moreover true when considering that molecular tests may sometimes be performed with tissue samples which is are poorly visible by human eye or by conventional microscopy such as conventional bright-field microscopy (e.g. unstained samples).

In a first phase of an improved workflow, these slices, e.g. unstained slices, may be mounted on respective slides. Each of these unstained slides may be mounted fixedly in a respective slide-receiving position 20 of a slide-holder of the invention. As notably proposed above, clamping means can be used in this effect. An image detection arrangement 56 may acquire an image per slide placed on the slide-holder, for example by means of a specific camera or a scanning microscope. The acquisition should be made such that each image includes the slide-holder registration points 16 (or registration means) which is associated to the corresponding slide at the respective (first) slide-receiving position. For instance, a first unstained slide image may represent the first slide 18 on the left of the slide-holder in FIG. 3a (hereinafter designated slide UnS1 for clarification purposes) as well its respective registration point(s) being in this example at least one of the V-shapes above and below the first slide-receiving position. In the same manner, a second unstained slide image may represent the slide next on the right hand side of the first slide (FIG. 3a, herein-after designated image slide UnS2) as well as its respective registration point(s) being at least one of the V-shapes positioned above and below the slide-receiving position which is next to said first slide-receiving position. In an option, a whole image for all these slides and associated information described above may be obtained instead of one image per slide.

The images thus obtained may be analyzed by a computer algorithm to detect therein the slide-holder registration points and its respective locations. For example, any of these images may be modified for centering the V-shape in the field of view of the image in question, by performing translation and/or cropping operations on the pixel content. Furthermore, when at least two slide-holder registration points are provided per slide-receiving position—one at a first side of the slide-receiving position and the other at the opposite side of the slide-receiving position (like shown for example in FIG. 1, or 3a)—the algorithm may be further configured to correct the orientation of any of the images by causing a rotation of its pixel content, respectively. Indeed, it may be preferred in the following of the workflow that each image represents its two slide-holder registration means vertically, like the vertical configuration of the two balls on the slide-holder fixation arrangement. The person skilled in the art will appreciate here that the use of a V-shape form used for each of these slide-holder registration means provides a very effective way to determine which rotation(s) may be needed.

At the end of the first phase, these images of the unstained slides may be stored for example in a PACS for being retrieved later in a second phase which will be described in details herein-after. Further, the pathologist may also remove the slide-holder from the image detection arrangement and store it with the slides kept mounted in a storage area like one mentioned previously in this application.

During the first phase or the second phase, the pathologist may obtain another image of a tissue slice that has been cut from the same tissue block mentioned above. For sake of clarity, this slide and image will be designated herein-after as the reference slide and the reference image. Note that, as also described previously in the application and clear for any skilled person in the art the reference image may also be one stored in a digital pathology system (e.g. a PACS or Laboratory Information System) before the first phase, so that the step of obtaining this image may just involve its query and local reception. In any case, this image should be such that any potential region of interest in the tissue slice may be detected and located very easily by the pathologist or by a computer algorithm. In this effect, it may be preferred that the tissue slice be stained with H&E, thereby dealing with an H&E slide image as the reference image. As just said, a region of interest may be identified in this image, this region being one in which the biological material is determined to be the most appropriate for the targeted molecular tests. As an example the identification may take the form of an annotation associated to the reference image, such as for example a drawing contour around one or more detected tumor areas. The same region of interest, may be found in any of the unstained slide images obtained in the first phase, by computerized image registration with respect to the reference image. Indeed, as is well-known, such a registration notably provides information about spatial correspondences between the registered images such that any corresponding (same) regions can be located from one image to the other. Similarly, the annotation that has been created in the reference image may be found in any or all the unstained slide images. As is well-known and as a non-limitative example, such an image registration may rely on tissue morphology matching analysis. The reference image and the unstained slide images thus annotated may be updated in the storage/memory. In the second phase of the improved workflow, the slide-holder with the unstained slides kept fixed to it may be retrieved from the storage area, by the pathologist or any well-known automatic system. The slide-holder may then be placed in the receiving space 32 of a slide-holder fixation arrangement of a sample processing station 58, as described previously in this application. If the only goal is to extract material from the slides, the sample processing station may not necessarily include an image detection arrangement. It may be limited to systems which are just necessary for this goal. In the example described here, the station may just include a table for fixedly maintaining the slide-holder fixation arrangement, the slide-holder, and a system for transferring annotations to the slides (including for example a projector).

For sake of further clarification, keeping the example with two V-shapes at the slide-holder, the receiving space may then comprise one ball for mechanical interaction with any of the V-shapes that are on top of the slide-receiving positions and one second ball for mechanical interaction with any of the V-shapes that are under the slide-receiving positions. The slide-holder may be moved preferably by the pathologist in translation in the receiving space until a first couple of V-shapes engages with the couple of balls. At this moment in time, the pathologist may perceive a certain mechanical resistance helping to understand that he/she should stop exerting the moving force on the slide-holder. A first unstained slide at a first imaging position, say for example slide UnS1, is therefore ready to undergo the next steps of the improved workflow. Note that the slide-holder is now kept in a resilient manner at a stable position in the receiving space such that a certain pressure sufficient to extract any piece of tissue on slide UnS1 may be exerted without causing any slide movement. For example, the pathologist may be able to exert such a pressure with a knife for manual scraping of tissue.

In order for the pathologist to identify at said first slide UnS1 currently in position the region of interest that has been identified from the reference image, the annotation associated to slide UnS1, which has been found by the previously described registration with the annotation in the reference slide, may be retrieved from memory and spatially transferred to slide UnS1, as described in this application. In this way, the pathologist may be able to see the transferred annotation on slide UnS1 and easily find the region of the interest he/she may be supposed to extract. For instance, the sample processing station is one configured to project the annotation in a projection area covering the area all around the current imaging position. For instance, the slide-holder fixation arrangement may be fixedly mounted onto an LCD projector in a precise spatial relationship between its projection area and the slide-holder fixation arrangement (e.g. its balls) such that the transferred annotation can be seen by the pathologist through the slide UnS1 (tissue included).

It is reminded here that the transfer of the annotation from the unstained slide image of slide UnS1 physically to this slide UnS1 placed on the slide-holder at the first imaging position (e.g. at the correct position in the projection area of the LCD projector) is made possible notably thanks to the presence of the registration means, e.g. the V-shapes, in the unstained slide image of slide UnS1. Indeed, the determination of the position of the annotation in the image with respect to the V-shapes in the image may be calculated in a straight forward manner. Next, the position of each unstained slide on the slide-holder is known by mechanical construction of the slide-holder and also because it is reminded that these slides have been held in position on the slide-holder from the beginning of the workflow. The spatial relationship of the V-shapes in the slide-holder with respect to the image projection area or other component like for example the slide-holder fixation arrangement is also known by the mechanical construction, notably the fixed position of the balls of the slide-holder fixation arrangement.

Once the region of interest has been extracted from tissue slice on slide UnS1, a molecular test may be performed at any desired moment.

The system enables the pathologist to get (e.g. extract or cut) the other regions of interest from the other unstained slides mounted on the slide-holder in a very convenient and efficient manner. For instance, in order to obtain from the unstained slide UsN2 the region of interest which corresponds again to the region of interest identified previously in the reference slide and reference image, the slide-holder may be shifted again within the receiving space of the slide-holder fixation arrangement until the registration point(s), e.g. the V-shapes, on top and beneath the slide-receiving position of slide UnS2 get engaged by the two balls. As for slide UnS1, the same annotation may again be transferred to slide UnS2 by e.g. projection of the annotation image in the projection area, the region of interest may therefore be extracted in an easy manner. This efficient process may be repeated for each next slide mounted on the slide-holder, thereby quickly and easily obtaining said several regions of interests for said several molecular tests. To further increase the efficiency of the workflow the pathologist may place slides of a same case on a same slide-holder.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A method for digital pathology, the method comprising the following steps:
   a1) receiving a slide-holder comprising a tray basis with a plurality of slides mounted thereon in a receiving space of a slide-holder fixation arrangement in a first position; wherein in the first position, registration means of the slide-holder fixation arrangement are mechanically interacting with interacting portions of slide-holder registration points of the slide-holder;
   a2) processing a first slide of the plurality of slides;
   b1) moving the slide-holder to a second position; wherein in the second position, registration means of the slide-holder fixation arrangement are mechanically interacting with second slide-holder registration points of the slide-holder; and
   b2) processing a second slide of the plurality of slides; wherein, based on the interaction, a mechanical registration of each slide in relation to an imaging system is provided;
   wherein the slide-holder registration points are provided as bi-functional registration points, wherein the interacting portions, in addition to the mechanical registration, provide visible markers in images of the respective slides, and wherein each of said slide processing steps comprises:

acquiring an image of the slide and of a visible marker provided by the interacting portions, identifying the visible marker in the acquired image, and performing an optical registration with the tray basis of the image, using the identified marker as reference point.

2. The method of claim 1, wherein it is provided:

c) identifying a location of a point or region of interest on at least one of the slides of the slide-holder in a spatial relation to the slide-holder in a first slide handling device; and d) transferring the location from the slide-holder to a slide of the slide-holder in a spatial relation to the slide-holder in a second slide handling device.

3. The method of claim 2, wherein it is provided:

identifying a location of a point or region of interest on at least one image of a stained slide in a spatial relation to a slide-holder based on optical registration; and transferring the location from the at least one image of the stained slide to at least one unstained slide of the slides of the slide-holder based on mechanical registration of the slide-holder.

4. The method of claim 3, wherein the slide-holder registration points comprise a plurality of interacting portions for said mechanical interacting, wherein said interacting portions are provided as markers and used for each respective optical registration, and wherein borders of slide-holder registration points of the registration means are provided as the markers.

5. The method of claim 1, wherein the slide-holder comprises a tray basis, and the interacting portions of the slide-holder registration points are provided as recesses of the tray basis; wherein the registration means of the slide holder-fixation arrangement are provided as protrusions to engage with respective recesses of the tray basis; wherein the recesses are provided as V-shaped recesses that provide a centered abutting of a protrusion element for the mechanical registration and that provide a detection in image processing for the optical registration.

6. A digital pathology system comprising a slide-holder and an image detection arrangement, the slide-holder comprising:

a tray basis;

a plurality of mounting means; and a plurality of slide-holder registration points;

wherein the tray basis is configured to carry a plurality of slides to be imaged by the digital pathology system, for which the tray basis provides a plurality of slide-receiving positions;

wherein the plurality of mounting means are arranged on the tray basis to mount the plurality of slides on the tray basis in a plurality of slide-receiving positions to image each slide in a separate imaging position;

wherein the slide-holder registration points comprise a plurality of interacting portions that provide a mechanical registration of the tray basis with a digital pathology system for each of the imaging positions, wherein the slide-holder registration points are provided as bi-functional registration points, wherein the interacting portions, in addition to the mechanical registration, are provided as visible markers in images of the respective slides, wherein the system comprises an image detection arrangement arranged to acquire said images of the respective slides and of the respective visible markers, and wherein the system is further arranged to perform an optical registration with the tray basis of each image of each respective slide acquired using the image detection arrangement, by identifying the visible markers in the images and using these identified markers as reference points in the optical registration.

7. The digital pathology system of claim 6, wherein the slide handling arrangement comprises a sample processing station that is provided for a further analysis as a second phase;

wherein for the sample processing, the mechanical registration is used; and wherein the sample processing station comprises a dissection arrangement.

8. The digital pathology system of claim 6, wherein annotation means are provided that are configured to identify a location of a point or region of interest on a slide of a slide-holder in a spatial relation to the slide-holder in a first slide handling device; and wherein a transfer unit is provided that is configured to transfer the location of the identified point or region of interest on the slide-holder in a spatial relation to the slide-holder in a second slide handling device.

9. The digital pathology system of claim 8, wherein a marking unit is provided that comprises marking means to indicate the transferred location on the slide of the slide-holder.

10. The digital pathology system of claim 9, wherein an extraction unit is provided that comprises extraction means to extract a part of the tissue material at the transferred location on the slide of the second slide-holder slide handling device.

11. The digital pathology system of claim 6, wherein a store area unit is provided that comprises at least one receptacle for receiving a slide-holder;

wherein the slide-holder comprises a plurality of mounted slides; and/or wherein further comprising a handling unit for transferring a slide-holder between the store area and the image detection arrangement in order to scan the slides and to place back the slide-holder to the store area.

12. The digital pathology system of claim 6, comprising a slide-holder fixation arrangement, the slide-holder fixation arrangement comprising: a receiving space to receive the slide-holder; and registration means to interact with the slide-holder registration points and provide the mechanical interaction which provides a positioning of a slide-holder in the plurality of positions.

13. The digital pathology system of claim 12, wherein the registration means are provided as protrusions to engage with recesses of the tray basis of the slide-holder; and wherein the protrusions are provided at least partly as resiliently supported balls.

14. The digital pathology system of claim 12, wherein the interacting portions of the slide holder are provided as mechanical abutting surface configured to engage with mechanical registration means of the slide-holder fixation arrangement for positioning the respective slide of the plurality of slides mounted on the slide-holder in relation to the system; and wherein the interacting portions are provided as recesses of the tray basis; and wherein the recesses are provided as V-shaped recesses that provide a centered abutting of a protrusion element for the mechanical registration and that provide a detection in image processing for the optical registration.

15. The digital pathology system of claim 14, wherein the registration means are provided as protrusions to engage with recesses of the tray basis of the slide-holder; and wherein the protrusions are provided at least partly as resiliently supported balls.

* * * * *